US010653109B2

(12) United States Patent
Lefebvre

(10) Patent No.: US 10,653,109 B2
(45) Date of Patent: May 19, 2020

(54) FARROWING SYSTEM WITH PIGLET BIRTH DETECTION AND METHOD FOR OPERATING THE SAME

(71) Applicant: JYGA CONCEPT INC., St-Lambert-de-Lauzon (CA)

(72) Inventor: Alain Lefebvre, Saint-Lambert-de-Lauzon (CA)

(73) Assignee: JYGA CONCEPT INC., Saint-Lambert-de-Lauzon, Quebec (CA)

(*) Notice: Subject to any disclaimer, the term of this patent is extended or adjusted under 35 U.S.C. 154(b) by 0 days.

(21) Appl. No.: 16/465,471

(22) PCT Filed: Dec. 1, 2017

(86) PCT No.: PCT/IB2017/057585
§ 371 (c)(1),
(2) Date: May 30, 2019

(87) PCT Pub. No.: WO2018/100555
PCT Pub. Date: Jun. 7, 2018

(65) Prior Publication Data
US 2020/0060223 A1 Feb. 27, 2020

Related U.S. Application Data

(60) Provisional application No. 62/429,343, filed on Dec. 2, 2016.

(51) Int. Cl.
*A01K 1/02* (2006.01)
*A01K 29/00* (2006.01)
(Continued)

(52) U.S. Cl.
CPC .......... *A01K 1/0218* (2013.01); *A01K 1/0076* (2013.01); *A01K 1/0209* (2013.01); *A01K 5/0283* (2013.01); *A01K 29/005* (2013.01)

(58) Field of Classification Search
CPC .. A01K 1/0209; A01K 1/0218; A01K 1/0076; A01K 5/00; A01K 5/02;
(Continued)

(56) References Cited

U.S. PATENT DOCUMENTS 5,424,957 A * 6/1995 Kerkhoff ................. A01K 5/02
700/240
5,778,820 A * 7/1998 van der Lely ........ A01J 5/0175
119/14.02
(Continued)

FOREIGN PATENT DOCUMENTS

CA 2406359 C 4/2003
CA 2573897 A1 2/2006
(Continued)

OTHER PUBLICATIONS

International Search Report; Canadian Intellectual Property Office; International Application No. PCT/IB2017/057585; dated Feb. 2, 2018; 4 pages.
(Continued)

Primary Examiner — David J Parsley
Assistant Examiner — Danielle A Clerkley
(74) Attorney, Agent, or Firm — Taft Stettinius & Hollister LLP

(57) ABSTRACT

A farrowing system including a farrowing pen adapted to receive a sow, a feed dispenser adapted to dispense feed to the sow received in the farrowing pen according to a first feeding pattern, at least one heating element providing heat to a portion of the farrowing pen, a birth detection sensor for detecting a birth of a piglet from the sow, and a controller operatively connected to the birth sensor, to the feed dispenser and to the at least one heating element for switching from the first feeding pattern to a second feeding pattern and for activating the at least one heating element upon detection
(Continued)

of the birth. There is also provided a method for operating a farrowing system and a method for dispensing feed to a farrowing sow.

22 Claims, 12 Drawing Sheets

(51) Int. Cl.
  *A01K 1/00* (2006.01)
  *A01K 5/02* (2006.01)
(58) Field of Classification Search
  CPC .. A01K 5/0233; A01K 5/0275; A01K 5/0283; A01K 5/0291; A01K 29/00; A01K 29/005; A61D 17/00; A61D 17/006; A61D 17/008
  USPC .................................................. 119/503–509
  See application file for complete search history.

(56) References Cited

U.S. PATENT DOCUMENTS

| | | | |
|---|---|---|---|
| 6,375,612 B1* | 4/2002 | Guichon | A01K 11/008 600/300 |
| 8,098,163 B2* | 1/2012 | Labrecque | A01K 1/0218 119/508 |
| 10,195,008 B2* | 2/2019 | Mikkelsen | A01K 1/0218 |
| 2003/0226522 A1* | 12/2003 | Thibault | A01K 1/0023 119/842 |
| 2017/0196203 A1* | 7/2017 | Huisma | A01K 29/005 |

FOREIGN PATENT DOCUMENTS

| | | |
|---|---|---|
| CA | 2503260 A1 | 10/2006 |
| CA | 2873333 A1 | 6/2015 |

OTHER PUBLICATIONS

Written Opinion of the International Search Authority; Canadian Intellectual Property Office; International Application No. PCT/IB2017/057585; dated Feb. 2, 2018; 4 pages.

Frank Aherne; Feeding Strategies for Lactating Sows; National Hog Farmer; http://www.nationalhogfarmer.com/mag/farming_feeding_strategies_lactating; Sep. 15, 2004; 31 pages.

Greg Simpson; Feeding Sows Right all the Way Through; Ontario Ministry of Agriculture, Food and Rural Affairs; http://www.omafra.gov.on.ca/english/livestock/swine/facts/info_sows.htm; Mar. 1, 2004; 6 pages.

* cited by examiner

FARROWING SYSTEM WITH PIGLET BIRTH DETECTION AND METHOD FOR OPERATING THE SAME

CROSS REFERENCE TO RELATED APPLICATIONS

This application is a U.S. National Phase of International PCT Application No. PCT/IB2017/057585 filed Dec. 1, 2017, which claims the benefit of U.S. Provisional Patent Application Ser. No. 62/429,343 filed Dec. 2, 2016, the contents of each application are incorporated herein by reference in their entirety.

TECHNICAL FIELD

The invention relates to farrowing pens/crates/stalls and feeding and/or heating systems therefor, and more precisely to farrowing pens/crates/stalls and feeding and/or heating systems therefor which include birth detection of a piglet and methods for operating the same.

BACKGROUND OF THE ART

The swine industry makes use of feeding systems to improve the performance achieved by the pork producers. Automated and computerized feeding systems are known to provide an adequate nutrition for farrowing and lactating sows.

Genetic capacity for high piglet survival and growth rate combined to the selection for larger litters increases the demands on sows during lactation. Therefore, they lose more weight during lactation.

Studies have shown that the body reserve of the lactating sow must be controlled to improve their health. Controlling the body reserve of the lactating sow can be achieved by maximizing the sow feed intake during lactation. Improving the body condition of the sow and its milking capacity is achieved by offering multiple meals during the day in order to increase the sow's daily feed intake. It has been shown that an increase in average feed intake of 1 kg/day by the sow can improve piglet wean weight by 0.25 kg and the next litter size by at least 0.5 piglet.

Meeting the feed needs of the lactating sow can maximize the sow milk production, produce heavier litters, keep the sow in good body condition, reduce the gestation feed costs, reduce the weaning-to-oestrus interval, produce heavier piglets at weaning, ensure a high fertility rate and a high number of piglets per litter and can allow a high number of production cycles. Automated feeding systems are typically adapted to monitor and analyze the sow's feed consumption and may therefore readjust a sow's feeding schedule.

Pork producers may control the sow's feeding schedule and access to feed through automated feeding systems. In prior art systems, the farmer may manually modify a sow's feeding schedule when he realizes the sow has reached the lactation stage. However, many hours may have passed since the birth of the first piglet of the litter. The benefits of providing the sow with a lactation diet, different from the gestation diet, cannot be achieved until this detection of the birth of the piglet is made. If the diet modification is made too early, before lactation has begun, the sow may overeat and be in poor overall condition for birthing.

Additionally, the environmental conditions required by the gestating sow are different from that of the lactating sow and from that of the newly born piglets. Temperature control is crucial. Piglets typically have a reserved stall area which can be heated to temperatures much higher than that preferred by the gestating or lactating sow. The sow typically enjoys a surrounding temperature of about 18° C. Piglets need a much higher temperature of between about 24'C. and 38° C.

The reserved area is usually heated by a lamp or a heated mat which can be turned on in advance of the birth of the piglets by the farmer to warm up the reserved area. Unfortunately, the lamp may radiate some heat in the direction of the gestating sow and may cause discomfort of the sow. Furthermore, the lamp or mat, when not calibrated properly, may actually cause the reserved area to be too warm for the piglets. The piglets will then move away from the center of heat to find a spot with an appropriate temperature. If the lamp or mat produces insufficient heat, the piglets may suffer from hypothermia which can lead to serious health issues, including death of the piglets.

There is an inherent energy waste caused by the turning on of the lamp or flooring prior to an adequate moment and by the lamp causing excessing heat in the reserved area.

There is therefore a need for an apparatus, system and/or method which would overcome at least one of the above-identified drawbacks.

SUMMARY

The present method and system offer a detection of the birth of the piglets which may lead to a better control of the feed intake of the lactating sow and of the temperature of the environment of the sow and the piglets.

According to one aspect, there is provided a farrowing system comprising: a farrowing pen adapted to receive a sow; a feed dispenser adapted to dispense feed to the sow received in the farrowing pen according to a first feeding pattern; a birth detection sensor for detecting a birth of a piglet from the sow; and a controller operatively connected to the birth sensor and to the feed dispenser for switching from the first feeding pattern to a second feeding pattern upon detection of the birth of the piglet.

In one embodiment, the farrowing pen includes a sow receiving space for receiving the sow and a main piglet receiving area adjacent the sow receiving space for receiving the piglet.

In one embodiment, the farrowing pen further includes a floor and a roof panel extending over a portion of the main piglet receiving area, the roof panel being generally planar and spaced upwardly from the floor to define an alcove therebetween, the alcove being sized and shaped to receive the piglet.

In one embodiment, the system further includes at least one heating element operatively connected to the controller and disposed towards the main piglet receiving area for providing heat to the main piglet receiving area, the controller being configured to activate the at least one heating element upon detection of the birth of the piglet.

In one embodiment, at least one heating element includes a first heating lamp located in the main piglet receiving area and a second heating lamp.

In one embodiment, the at least one heating element includes a heating mat disposed in the main piglet receiving area.

In one embodiment, the system further includes a thermal sensor operatively connected to the controller and disposed in the main piglet receiving area for measuring the temperature in the main piglet receiving area.

In one embodiment, the controller is configured to maintain the temperature in the main piglet receiving area at a target temperature by measuring the temperature in the main piglet receiving area and by adjusting the intensity of the at least one heating element according to the measured temperature until the measured temperature reaches the target temperature.

In one embodiment, the controller is configured to maintain the temperature in the main piglet receiving area at a target temperature by measuring the temperature in the main piglet receiving area and by selectively activating the at least one heating element at a predetermined intensity when the measured temperature is below the target temperature and deactivating the at least one heating element when the measured temperature is at or above the target temperature.

In one embodiment, the farrowing pen includes a first vertical barrier and a second vertical barrier parallel to and spaced from the first vertical barrier to define the sow receiving space therebetween.

In one embodiment, the first and second vertical barriers are selectively movable laterally towards and away from each other to allow the width of the sow receiving space to be adjusted depending on the size of the sow received in the sow receiving space.

In one embodiment, the system further comprises a feed container disposed between the first and second vertical barriers to receive feed from the feed dispenser.

In one embodiment, the feed dispenser includes a first feed dispensing unit adapted to dispense a first feed type and a second dispensing unit adapted to dispense a second feed type.

In one embodiment, the birth detection sensor is selected from a group consisting of: a movement sensor and a thermal sensor.

According to another aspect, there is also provided a method for operating a farrowing system, the method comprising: providing feed to a sow in a farrowing pen according to a first feeding pattern;
monitoring the farrowing pen; upon detection of a birth of a piglet from the sow, switching from the first feeding pattern to a second feeding pattern.

In one embodiment, the method further comprises, upon detection of the birth of the piglet from the sow, activating at least one heating element.

In one embodiment, activating at least one heating element includes activating a first heating lamp and activating a second heating lamp.

In one embodiment, activating the first heating lamp includes activating the first heating lamp for a first period of time and further wherein activating the second heating lamp includes activating the second heating lamp for a second period of time shorter than the first period of time.

In one embodiment, activating the first heating lamp includes: measuring a temperature in a portion of the farrowing pen; comparing the measured temperature with a target temperature; adjusting an intensity of the first heating lamp according to a difference between the measured temperature and the target temperature.

In one embodiment, the target temperature varies as a function of time according to a predetermined temperature pattern.

In one embodiment, activating at least one heating element includes: deactivating the at least one heating element during the providing of the feed; reactivating the at least one heating element after the providing of the feed.

In one embodiment, activating at least one heating element includes activating a heating mat and activating a heating lamp.

In one embodiment, providing feed includes providing a first feed type from a first feed dispensing unit and a second feed type from a second feed dispensing unit.

In one embodiment, the second feeding pattern is selected from a plurality of feeding patterns based on the sow's weight.

According to yet another aspect, there is also provided a farrowing system comprising: a farrowing pen adapted to receive a sow; a feed dispenser adapted to dispense feed to the sow received in the farrowing pen according to a first feeding pattern; at least one heating element providing heat to a portion of the farrowing pen; a birth detection sensor for detecting a birth of a piglet from the sow; and a controller operatively connected to the birth sensor, to the feed dispenser and to the at least one heating element for switching from the first feeding pattern to a second feeding pattern and for activating the at least one heating element upon detection of the birth of the piglet.

According to still another aspect, there is also provided a method for controlling a power consumption of a farrowing system including a feed dispenser adapted to provide feed to a sow according to a feeding pattern and at least one heating element, the method comprising: deactivating the at least one heating element during the providing of the feed: reactivating the at least one heating element after the providing of the feed.

According to yet another aspect, there is also provided a method for dispensing feed to a farrowing sow, the method comprising: determining a required daily energy intake of the sow; determining a required daily protein intake of the sow; providing a first dispensing unit configured to dispense a first feed type having a first protein content and a first energy content; providing a second dispensing unit configured to dispense a second feed type having a second protein content and a second energy content; determining a total amount of feed to be provided to the sow; selecting using a controller operatively connected to the first and second dispensing units a first amount of the first feed type and a second amount of the second feed type to be dispensed to the sow, the first and second amounts together forming the total amount of feed, the first and second amounts being selected according to the first and second protein content and the first and second energy content of the first and second types of feed such that the total amount of feed contains the required daily energy intake of the sow and the required daily protein intake of the sow; dispensing the selected first and second amount of feed to the sow.

In one embodiment, the required daily energy intake of the sow includes a first portion required to maintain the sow's weight during nursing and a second portion required to provide a target weight gain to a piglet litter nursed by the sow.

In one embodiment, the first portion is a function of the sow's weight.

In one embodiment, the target weight gain corresponds to a difference between a weight of the piglet litter measured on a first day and a weight of the piglet litter measured on a second day previous to the first day.

In one embodiment, the required daily protein intake of the sow includes a first portion required to maintain the sow's weight during nursing and a second portion required to provide a target weight gain to a piglet litter nursed by the sow.

In one embodiment, the first portion is a function of the sow's weight.

In one embodiment, determining a required daily energy intake of the sow includes the controller calculating the required daily energy intake of the sow based on the sow's weight and on a target weight gain of a piglet litter.

In one embodiment, determining a required daily protein intake of the sow includes the controller calculating the required daily protein intake of the sow based on the sow's weight and on a target weight gain of a piglet litter.

BRIEF DESCRIPTION OF THE DRAWINGS

Reference will now be made to the accompanying drawings, showing by way of illustration a preferred embodiment thereof and in which.

DETAILED DESCRIPTION

Figure 1:
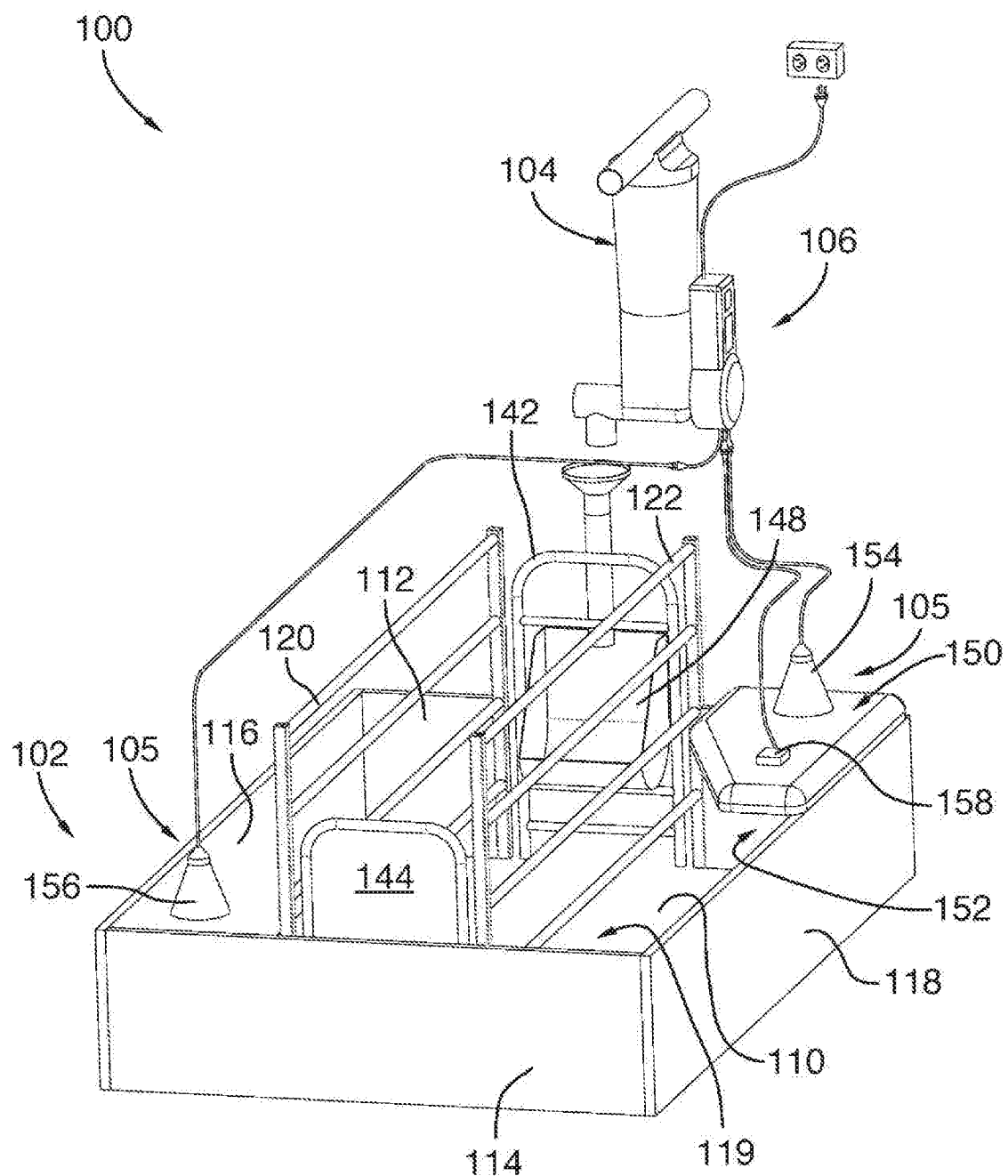
FIG. 1 is a top perspective view of a farrowing system, in accordance with one embodiment.
Figure 2:
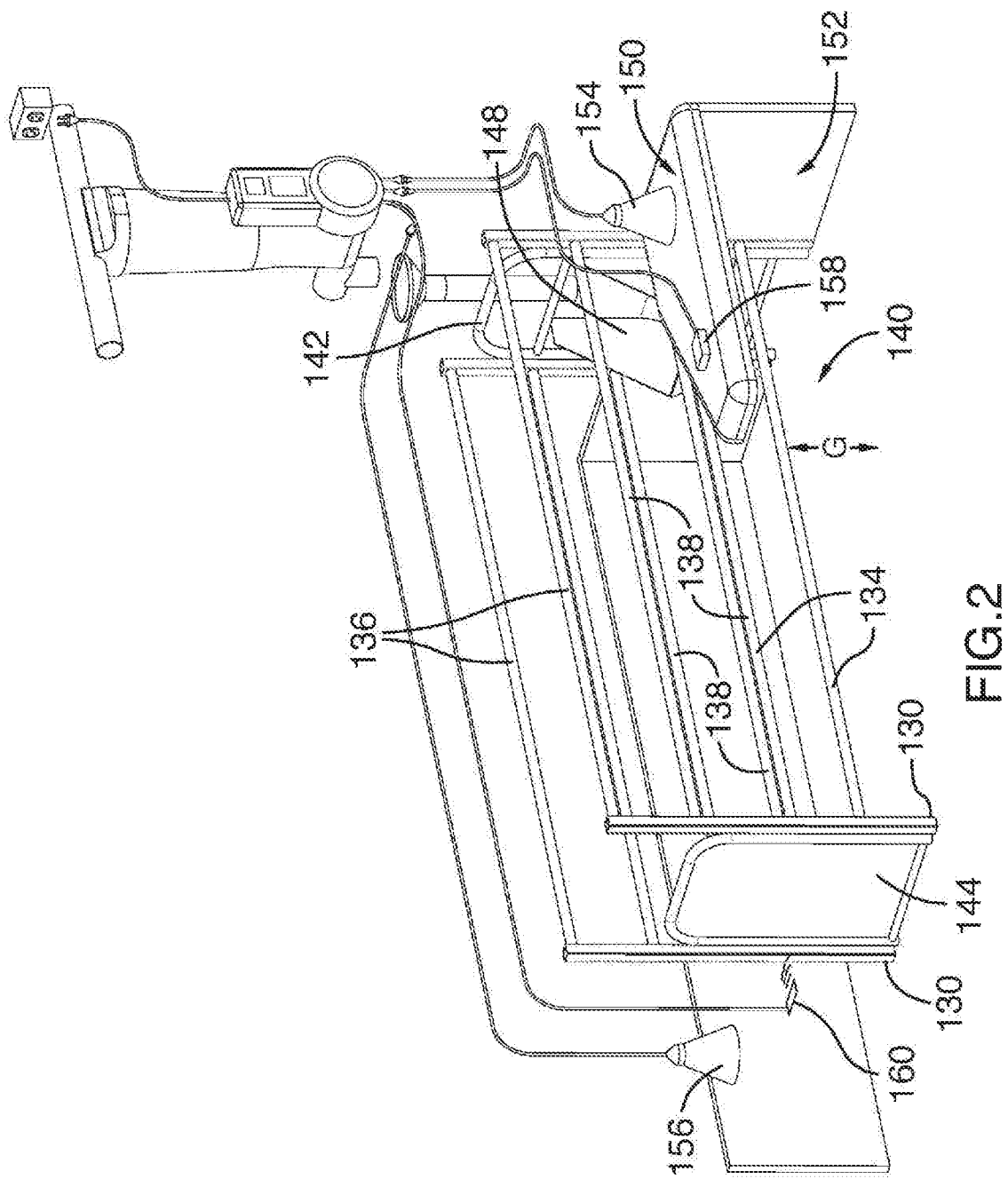
FIG. 2 is another top perspective view of the farrowing system illustrated in FIG. 1, with the rear and right side walls removed to show details of the farrowing pen.
Figure 3:
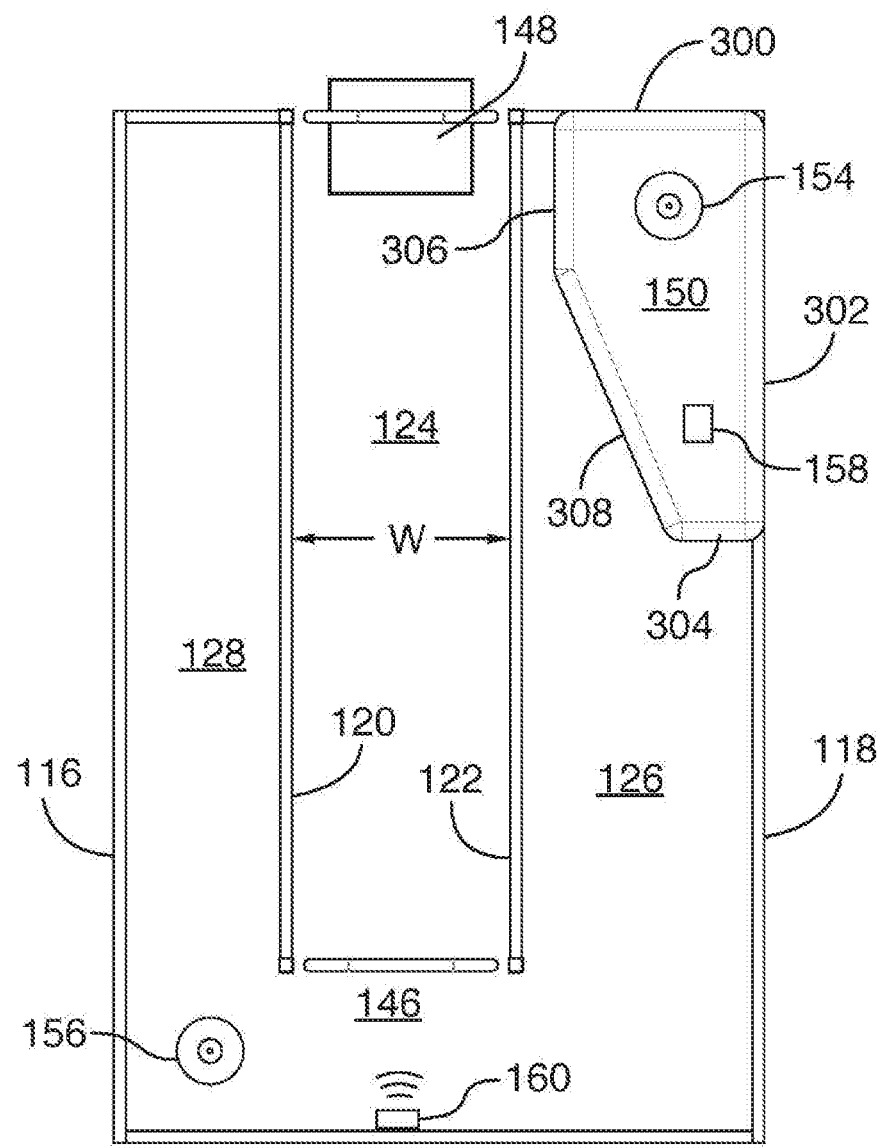
FIG. 3 is a top plan view of the farrowing system illustrated in FIG. 1, with the feed dispenser and the electrical wires omitted for clarity.

Referring to FIGS. 1 to 3, there is shown a farrowing system 100, in accordance with one embodiment.

The farrowing system 100 includes a farrowing pen 102 adapted to receive a sow, not shown, a feed dispenser 104 adapted to dispense feed to the sow received in the farrowing pen 102, at least one heating element 105 providing heat to a portion of the farrowing pen 102 and a controller 106 operatively connected to at least one of the feed dispenser 104 and the at least one heating element 105 to selectively activate the feed dispenser 104 and/or the heating element according to a desired pattern.

In the illustrated embodiment, the farrowing pen 102 is generally rectangular and includes a floor 110, front and rear side walls 112, 114 disposed parallel to each other and left and right lateral side walls 116, 118 disposed parallel to each other and perpendicular to the front and rear side walls 112, 114. The front, rear, left and right side walls 112, 114, 116, 118 extend generally vertically and upwardly from the floor 110 and define an enclosure 119 for receiving the sow and piglets born from the sow.

The farrowing pen 102 further includes left and right barriers 120, 122 which extend vertically and upwardly from the floor 110. Specifically, the left and right barriers 120, 122 are disposed within the enclosure 119, between the left and right lateral side walls 116, 118, and are generally parallel to the left and right lateral side walls 116, 118. The left and right barriers 120, 122 are further parallel to each other and spaced from each other to define a sow receiving space 124 therebetween, best shown in FIG. 3, to receive and hold the sow. Specifically, the sow receiving space 124 has a width W which is adapted to receive the saw such that the left and right barriers 120, 122 abut the sow to hold the sow and thereby prevent movement of the sow. The width W of the sow receiving space 124 may also be sufficient to allow the sow to lay on its side to thereby allow piglets to access its teats.

In one embodiment, the left and right barriers 120, 122 may be selectively movable laterally towards and away from each other and from the left and right lateral side walls 116, 118 to allow the width W of the sow receiving space 124 to be adjusted depending on the size of the sow received in the sow receiving space 124. Alternatively, the left and right barriers 120, 122 may not be movable.

In the illustrated embodiment, the right harrier 122 is further spaced from the right lateral side wall 118 to define a main piglet receiving area 126 between the right barrier 122 and the right lateral side wall 118. The left barrier 120 is further spaced from the left lateral side wall 116 to define a secondary piglet receiving area 128 between the left barrier 120 and the left lateral side wall 116.

Alternatively, the pen 102 could be configured differently. For example, the farrowing pen 102 may not include the secondary piglet receiving area 128 and the left barrier 120 could instead be disposed adjacent the left lateral side wall 116, or the farrowing pen 102 may not include the left barrier 120 at all. In this embodiment, the right barrier 122 may be spaced from the left lateral side wall 116 by the width W to define the sow receiving space 124 between the right barrier 122 and the left lateral side wall 116.

In yet another embodiment, the farrowing pen 102 may not include the main piglet receiving area 126 and the right barrier 122 could instead be disposed adjacent the right lateral side wall 118, or the farrowing pen 102 may not include the right barrier 122 at all. In this embodiment, the left barrier 120 may be spaced from the right lateral side wall 118 by the width W to define the sow receiving space 124 between the left barrier 120 and the right lateral side wall 118.

In the illustrated embodiment, each barrier 120, 122 includes a pair of vertical end posts 130 and a plurality of horizontal bars 132 extending between the vertical end posts 130.

Specifically, the plurality of horizontal bars 132 are vertically spaced from each other relatively evenly and includes a bottom bar 134, a top bar 136 and two intermediate bars 138 disposed between the bottom and top bars 134, 136. The bottom bar is spaced from the floor to define a gap 140 having a gap height G which is sufficiently large to allow piglets to pass from the receiving space 124 to the main or secondary area 126 or 128 after birth while still allowing the barriers 120, 122 to properly hold the sow. The gap height G of the gap 140 is further sufficient to allow the piglets access to the sow's teats when the sow is laying on its side in the sow receiving space 124.

Alternatively, the left and right barriers 120, 122 could be configured differently. For example, each barrier 120, 122 could include more or less than four horizontal bars 132, could include vertical bars instead of horizontal bars, or could even include a combination of horizontal and vertical bars.

In the illustrated embodiment, the farrowing pen 102 further includes front and rear door panels 142, 144, each one being pivotably connected to one of the vertical end posts 130 of the left and right barriers 120, 122 to allow the sow to selectively enter and exit the sow receiving space 124. Alternatively, the front and rear door panels 142, 144 may be slidable instead of being pivotable, or otherwise movable relative to the left and right barriers 120, 122. In another embodiment, the farrowing pen 102 may comprise only a single door panel.

Still in the illustrated embodiment, the rear door panel 144 is spaced from the rear side wall 114 to define a passageway 146 between the main piglet receiving area 126 and the secondary piglet receiving area 128 to allow piglets to move between the main piglet receiving area 126 and the secondary piglet receiving area 128. Alternately, the rear door panel 144 could instead be in the same vertical plane as the rear side wall 114 such that no passageway would be defined between the main piglet receiving area 126 and the secondary piglet receiving area 128.

The farrowing system further includes a feed container 148 disposed in the sow receiving space 124 for receiving feed from the feed dispenser 104. In the illustrated embodiment, the feed container 148 is disposed against the front door panel 142. The feed container 148 could be suspended from the front door panel 142 or from another elevated structure or, alternatively, rest on the floor 110.

When the sow is received in the sow receiving space 124, its head faces towards the front door panel 142 and its rear end is located towards the rear door panel 144. The sow thereby has access to the feed received in the feed container 148.

The feed dispenser 104 is operatively connected to the controller and includes an electric motor which selectively allow feed to be dispensed into the feed container 148 and prevents feed to be dispensed.

The farrowing pen 102 further includes a roof panel 150 extending over a portion of the main piglet receiving area 126. The roof panel 150 is generally planar and is spaced upwardly from the floor 110 to define an alcove or creep area 152 between the roof panel 150 and the floor 110. Specifically, the alcove 152 has a height which is sufficient to receive at least one piglet under the roof panel 150.

In the illustrated embodiment, the roof panel 150 is not fully rectangular, but instead has the shape of a truncated rectangle. More specifically, the roof panel 150 has first and second long edges 300, 302 extending respectively along the front and right side walls 112, 118 of the farrowing pen 102, a first short edge 304 parallel to and spaced from the first long edge 300, a second short edge 306 parallel to and spaced from the second long edge 302, and an oblique edge 308 extending between the first and second short edges 304, 306. Alternatively, the roof panel 150 could be rectangular, or have any other shape that a skilled addressee may consider appropriate. In yet another embodiment, the roof panel 150 and the alcove 152 could be located in a different location within the main piglet receiving area 126.

Still referring to FIGS. 1 to 3, the at least one heating element 105 includes a first heating lamp 154 located above the alcove 152 and a second heating lamp 156 located at the opposite corner of the farrowing pen 102 above the secondary piglet receiving area 128. Both the first and second heating lamps 154, 156 are generally suspended above the farrowing pen 102 and are adapted to provide heat downwardly to piglets in the farrowing pen 102.

Both the first and second heating lamps 154, 156 are operatively connected to the controller 106 and can be controlled by the controller 106. In one embodiment, the controller 106 is adapted to adjust the intensity of the first heating lamp 154 to provide a desired amount of heat to the main piglet receiving area 126, and more specifically to the alcove 152. It will be appreciated that this allows the piglets in or around the alcove 152 to be maintained at a target temperature for a certain amount of time.

In one embodiment, the controller 106 could be adapted to adjust the intensity of the first heating lamp 154 in a closed loop mode. Specifically, the farrowing system 100 further includes a thermal sensor 158 located within the main piglet receiving area 126. The thermal sensor 158 is operatively connected to the controller 106 to measure the temperature in at least a portion of the main piglet receiving area 126. The controller 106 could be adapted to maintain the temperature generally in and around the alcove 152 at or around a target temperature by measuring the temperature generally in and around the alcove 152 and by adjusting the intensity of the first heating lamp 154 according to the measured temperature.

Instead of adjusting the intensity of the first heating lamp 154, the controller 106 could alternatively maintain the temperature generally in and around the alcove 152 at or around the target temperature by selectively activating the first heating lamp 154 at a predetermined intensity when the measured temperature is below the target temperature and deactivating the first heating lamp 154 when the measured temperature is at or above the target temperature.

In the illustrated embodiment, the thermal sensor 158 is mounted to the roof panel 150. Alternatively, the thermal sensor could be located elsewhere in or near the alcove 152, or generally in the main piglet receiving area 126. Still in the illustrated embodiment, the thermal sensor 158 is an infrared sensor. Alternatively, the thermal sensor 158 could include any other types of thermal sensor that a skilled person may consider appropriate.

In one embodiment, the controller 106 is further adapted to selectively activate and deactivate the second heating lamp 156. Specifically, the second heating lamp 156 is simply adapted to dry the piglets for a short period immediately following their birth, and is not used to maintain the piglets at a target temperature for a relatively long period of time after their birth.

Alternatively, the controller 106 could be adapted to adjust the intensity of both the first and the second heating lamps 154, 156 or could simply selectively activate or deactivate both the first and the second heating lamps 154, 156.

In the illustrated embodiment, the farrowing system 100 further includes a birth detection sensor 160 for detecting a birth of a piglet from the sow. Still in the illustrated embodiment, the birth detection sensor 160 is located near the rear side wall 114 and faces towards the sow receiving space 124 to detect the presence of a piglet, which would indicate the recent birth of the piglet from the sow. Alternatively, the birth detection sensor 160 could be located elsewhere in the farrowing pen 102.

In one embodiment, the birth detection sensor 160 is a movement sensor. Since the sow is generally prevented from moving when received in the sow receiving space 124, measuring an amount of movement above a certain threshold would indicate the presence of a piglet. For example, the birth detection sensor 160 could be adapted to detect the actual birth of the piglet by detecting the piglet exiting the sow in the sow receiving space 124.

Alternatively, the birth detection sensor 160 could be adapted to detect movement of the piglet within the sow receiving space 124 or from the sow receiving space 124 to the main piglet receiving area 126 and/or the secondary piglet receiving area 128. As indicated above, the piglet will tend to move towards an area with an appropriate temperature after its birth. In one embodiment, this area is the alcove 152 as the temperature in or around the alcove 152 is at or around the target temperature. Shortly after birth, the piglet will therefore move towards the main piglet receiving area 126 and thereby cause detection of movement by the birth detection sensor 160. The piglet could also move towards the secondary piglet receiving area 128 instead of the main piglet receiving area 126 and thereby also cause movement by the birth detection sensor 160, indicative of the birth of the piglet.

Alternatively, the birth detection sensor 160 could include a thermal sensor adapted to detect a change in temperature within the sow receiving space 124 which would be indicative of the birth of a piglet. In yet another embodiment, the birth detection sensor 160 could include any other type of sensors that a skilled person may consider appropriate for detecting a birth of a piglet.

Figure 4:
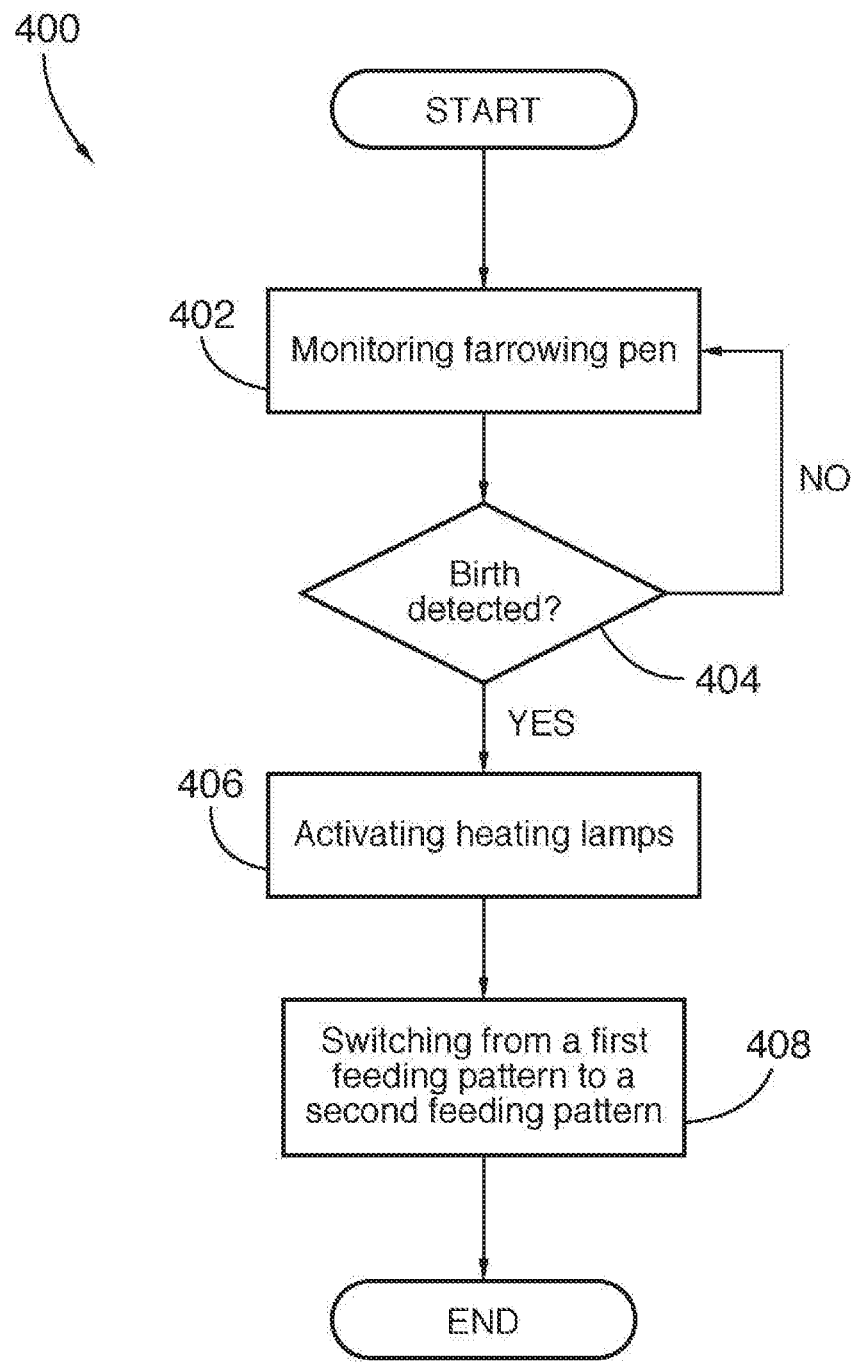
FIG. 4 is a flowchart showing a method for operating a farrowing system, in accordance with one embodiment.

Now turning to FIG. 4, there is shown a method 400 for operating the farrowing system 100, in accordance with one embodiment.

The farrowing system 100 described above is first provided, and a sow about to farrow is placed in the sow receiving space 124 of the farrowing pen 102. In one embodiment, a user may consider that the sow will farrow shortly and may place the sow in the farrowing pen 102 a few days before the sow is expected to farrow. Alternatively, the sow may be placed in the farrowing pen 102 sooner or later than a few days before it is expected to farrow.

In one embodiment, the user can use an interface operatively connected to the controller to input information such as an identifier associated with the sow, an age of the sow, or any other information that a skilled person would consider to be relevant. The interface could include a keyboard or keypad provided on the controller, a device such as a smart phone or a tablet computer wirelessly connected to the controller, a personal computer operatively connected to the controller, or any other types of interfaces that a skilled addressee would consider suitable.

Using the interface, the user can further activate the birth detection sensor 160. According to 402, the farrowing pen 102 is then monitored by the birth detection sensor 160. More specifically, the birth detection sensor 160 may continuously monitor the sow receiving space 124 in a closed loop, as shown at 404, until it detects a birth of a piglet.

It will be appreciated that sows usually give birth a litter including more than one piglet and that in this case, the birth of a piglet would refer to the birth of the first piglet in the litter of piglets.

When a birth of a piglet is detected by the birth detection sensor 160, the first and second heating lamps 154, 156 are activated, in accordance with 406. At this stage, the first and second heating lamps 154, 156 are mainly used to dry off the newborn piglets. It will be appreciated that the first heating lamp 154 is generally adapted to heat the main piglet receiving area 126 and that the second heating lamp 156 is generally adapted to heat the secondary piglet receiving area 128. It will further be appreciated that although the piglets will generally tend to move towards the main piglet receiving area 126 and into the alcove 152, some piglets of the litter of piglets may move towards the second piglet receiving area 128. In this case, the second heating lamp 156 will ensure that the piglets in the second piglet receiving area 128 are dried off similarly to the piglets in the main piglet receiving area 126. The piglets in the second piglet receiving area 128 can later move to the main piglet receiving area 126 and into the alcove 152 through the passageway 146 between the rear door panel 144 and the rear side wall 114.

According to 406, after the birth is detected, the first and second heating lamps 154, 156 both remain activated for a certain amount of time which defines a birth period immediately following the birth of the first piglet. In one embodiment, the birth period lasts for about 8 to 24 hours following the detection of the birth of the first piglet. The duration of the birth period may be predetermined, or the birth period may be terminated manually by a user after a certain amount of time. Alternatively, the birth period may last for a predetermined amount of time after the detection of a birth of a last piglet in the litter of piglets.

In the embodiment illustrated in FIG. 4, the feed dispenser 104 is further switched from a first or pre-birth feeding pattern to a second or post-birth feeding pattern when the birth is detected by the birth detection sensor 160, according to 408. In one embodiment, the pre-birth and post-birth feeding patterns includes a dispensing of multiple separate meals of feed at a predetermined frequency.

For example, the pre-birth feeding pattern may include the dispensing of smaller portions of feed of a first feed type providing a lower caloric intake appropriate for the preparation of the sow to the farrowing, and the post-birth feeding pattern may include larger portions of feed of a second feed type providing a higher caloric intake appropriate for the production of milk to nurse the newborn piglets.

Figure 5:
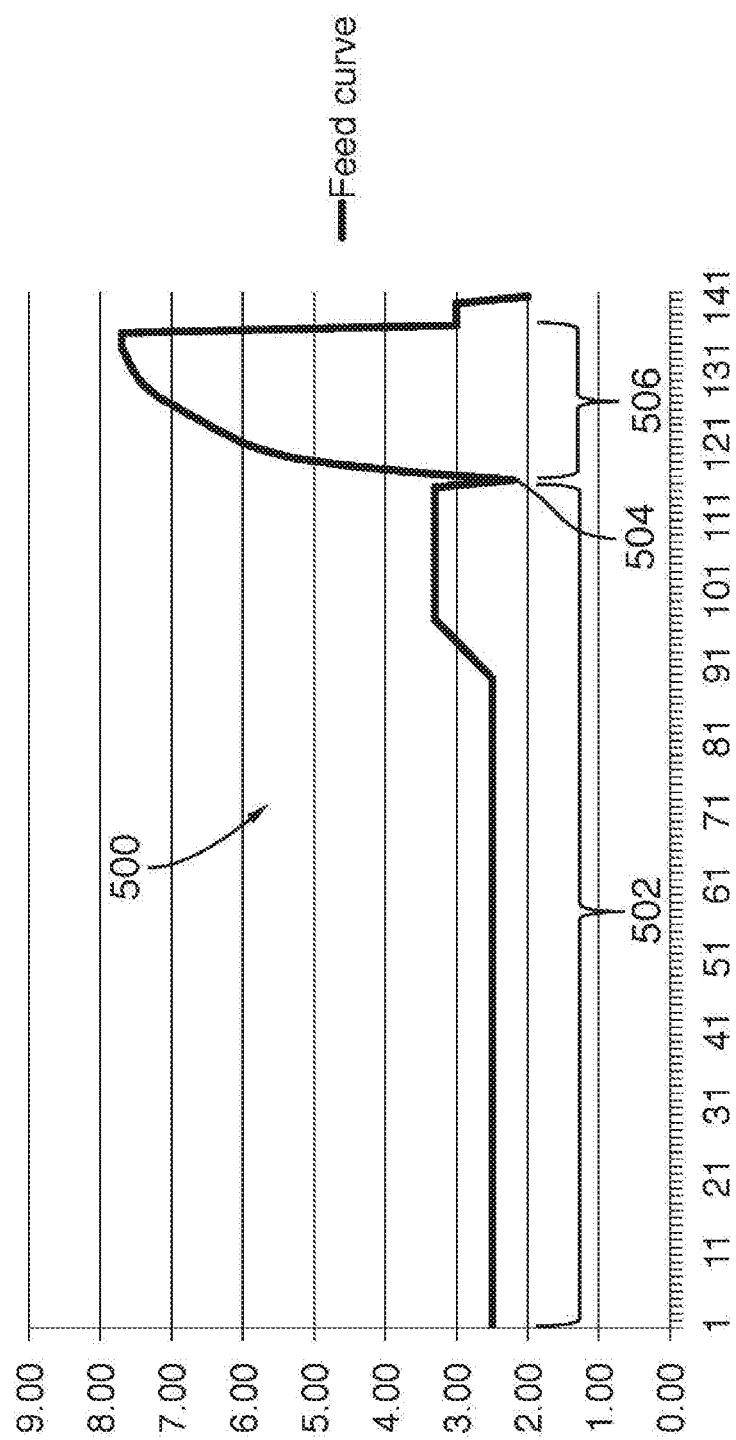
FIG. 5 is a chart showing a continuous sow feeding pattern expressed as an amount of food as a function of time in days, in accordance with one embodiment, the continuous sow feeding pattern including a pre-birth feeding pattern and a post-birth feeding pattern.

Referring to FIG. 5, there is shown an example of a continuous sow feeding pattern 500 expressed as an amount of food as a function of time, in days. The continuous sow feeding pattern 500 includes the pre-birth feeding pattern, labeled 502 and located before the birth labeled 504, and the post-birth feeding pattern, labeled 506 and located after the birth 504. It can be appreciated that the post-birth feeding pattern 506 includes the dispensing of a substantially larger quantity of food compared with the pre-birth feeding pattern 502, which corresponds to a much higher caloric intake required for lactation.

Figure 6:
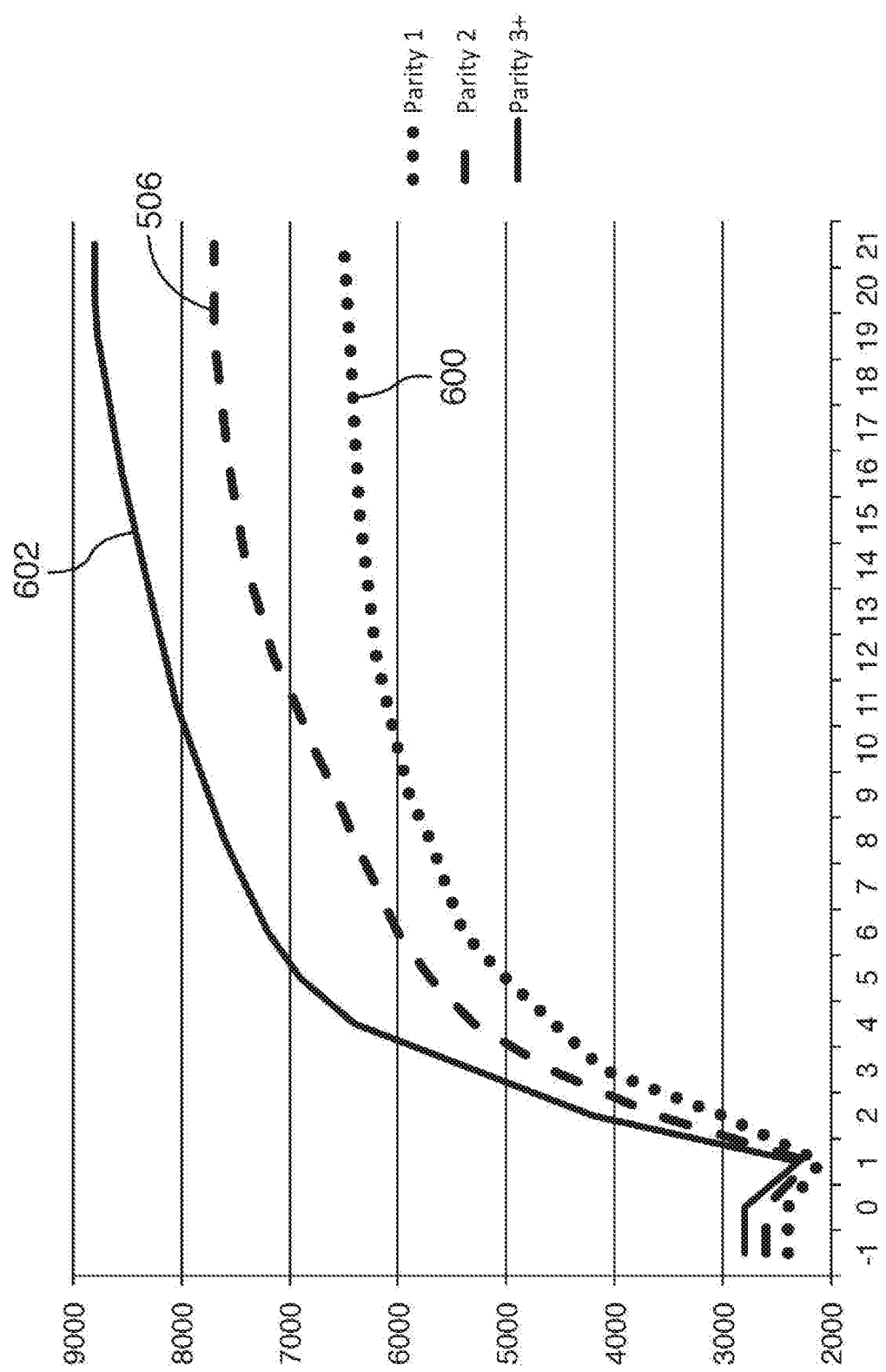
FIG. 6 is a chart showing a plurality of alternative post-birth feeding patterns.

Referring now to FIG. 6, there is shown multiple post-birth feeding patterns which may be selected by a user. In one embodiment, the user can adjust the post-birth feeding pattern 506 during the nursing period if desired. Specifically, the user could switch the post-birth feeding pattern 506 to a third feeding pattern 600 or a fourth feeding pattern 602 which would be slightly different from the post-birth feeding pattern.

In one embodiment, the feeding pattern 506 could be adjusted according to a parity number corresponding to a specific and distinct instance of the sow giving birth to a litter of piglets. For example, the third feeding pattern 600 may be suitable for a sow giving birth to a litter of piglets for the first time, i.e. a first parity, the feeding pattern 506 could be suitable for a sow giving birth to a litter of piglets for the second time, i.e. a second parity, and the fourth feeding pattern 602 could be suitable for subsequent parities of the sow, i.e. third or following parity. Alternatively, the feeding patterns could be selected according to various other parameters.

Figure 7:
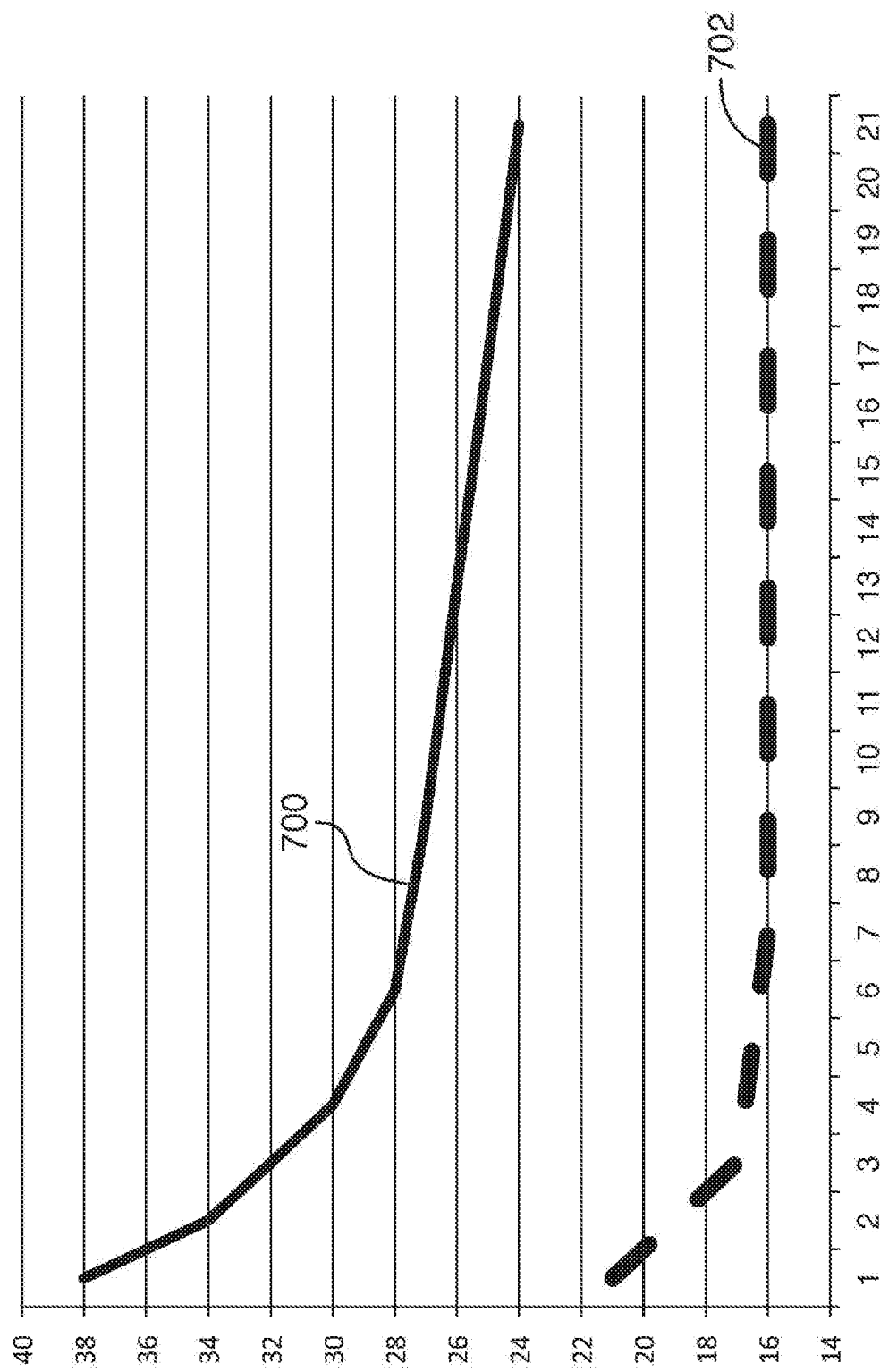
FIG. 7 is a chart showing a piglet temperature pattern and a sow temperature pattern as a function of time in days, in accordance with one embodiment.

Turning to FIG. 7, after the birth period, the piglets are kept in the farrowing pen 102 at the target temperature and nursed for a certain amount of time, or nursing period, which may last for about 21 days after the birth period.

When the birth period ends and the nursing period begins, the second heating lamp 156 is deactivated and the first heating lamp 154 is adjusted to allow the temperature in or around the alcove 152 to reach a target temperature. In one embodiment, the target temperature varies over time according to a piglet temperature pattern 700.

In the specific embodiment illustrated in FIG. 7, the piglet temperature pattern 700 is expressed as a temperature as a function of time, in days. It will be appreciated that the target temperature in the piglet temperature pattern 700 decreases over time.

As further shown in FIG. 7, the sow may further be maintained at a target sow temperature which varies over time according to a sow temperature pattern 702. It will be appreciated that the target sow temperature is substantially lower than the target temperature for the piglets. In one embodiment, the sow may be maintained at the target temperature by the first heating lamp 154 which may provide a certain amount of heat even if the first heating lamp 154 is not located in the sow receiving space 124. Alternatively, the sow may be maintained at the target temperature by other sources of heat.

At the end of the nursing period, the sow and the piglets may be removed from the farrowing pen 102. The farrowing system 100 may automatically deactivate the feed dispenser 104 and the first heating lamp 154 or, alternatively, the user may manually deactivate the feed dispenser 104 and the first heating lamp 154 using the interface.

In one embodiment, the controller 106 is further adapted to maintain the total power consumption of the farrowing system 100 at or below a predetermined threshold during operation of the farrowing system 100, including both the birth period and the nursing period.

For example, the predetermined total power consumption threshold may be 350 W. The first heating lamp 154 may have a maximum power consumption of 175 W when activated at full intensity during the birth period, and the second heating lamp 156 may have a power consumption of 175 W when activated during the birth period. When both the first and second heating lamps 154, 156 are activated during the birth period, the total power consumption of the farrowing system 100 is therefore about 350 W.

The feed dispenser 104 may further have a power consumption of 140 W when activated. In this embodiment, when the feed dispenser 104 is activated to provide a meal to the sow during the birth period, the first heating lamp 154 and/or the second heating lamp 156 are deactivated such that the total power consumption is about 140 W and therefore still remains below the threshold of 350 W.

Once the meal has been dispensed, the feed dispenser 104 is no longer activated and the deactivated first heating lamp 154 and/or second heating lamp 156 are reactivated to resume providing heat to dry off the newborn piglets.

In one embodiment, during the nursing period, the second heating lamp 156 is no longer activated and only the first heating lamp 154 is activated. The total power consumption at this time therefore varies between 0 W and the power consumption of the first heating lamp 154, i.e. 175 W in the above example.

When the feed dispenser 104 is activated to provide a meal to the sow during the nursing period, the first heating lamp 154 may further be deactivated to further lower the total power consumption. The total power consumption would therefore only include the power consumption of the feed dispenser 104, i.e. 140 W. Alternatively, the first heating lamp 154 may remain activated during the dispensing of feed by the feed dispenser 104. In this case, the total power consumption would therefore vary between 140 W and 315 W.

It will be appreciated that in addition to reducing costs, a minimal power consumption may also reduce the amount of electromagnetic radiation emitted by the farrowing system 100, which is beneficial for the sow and the piglets. Specifically, the predetermined total power consumption threshold may correspond to a desired maximum amount of electromagnetic radiation emitted by the farrowing system 100. Alternatively, the system 100 may not comprise a predetermined total power consumption threshold.

Figure 8:
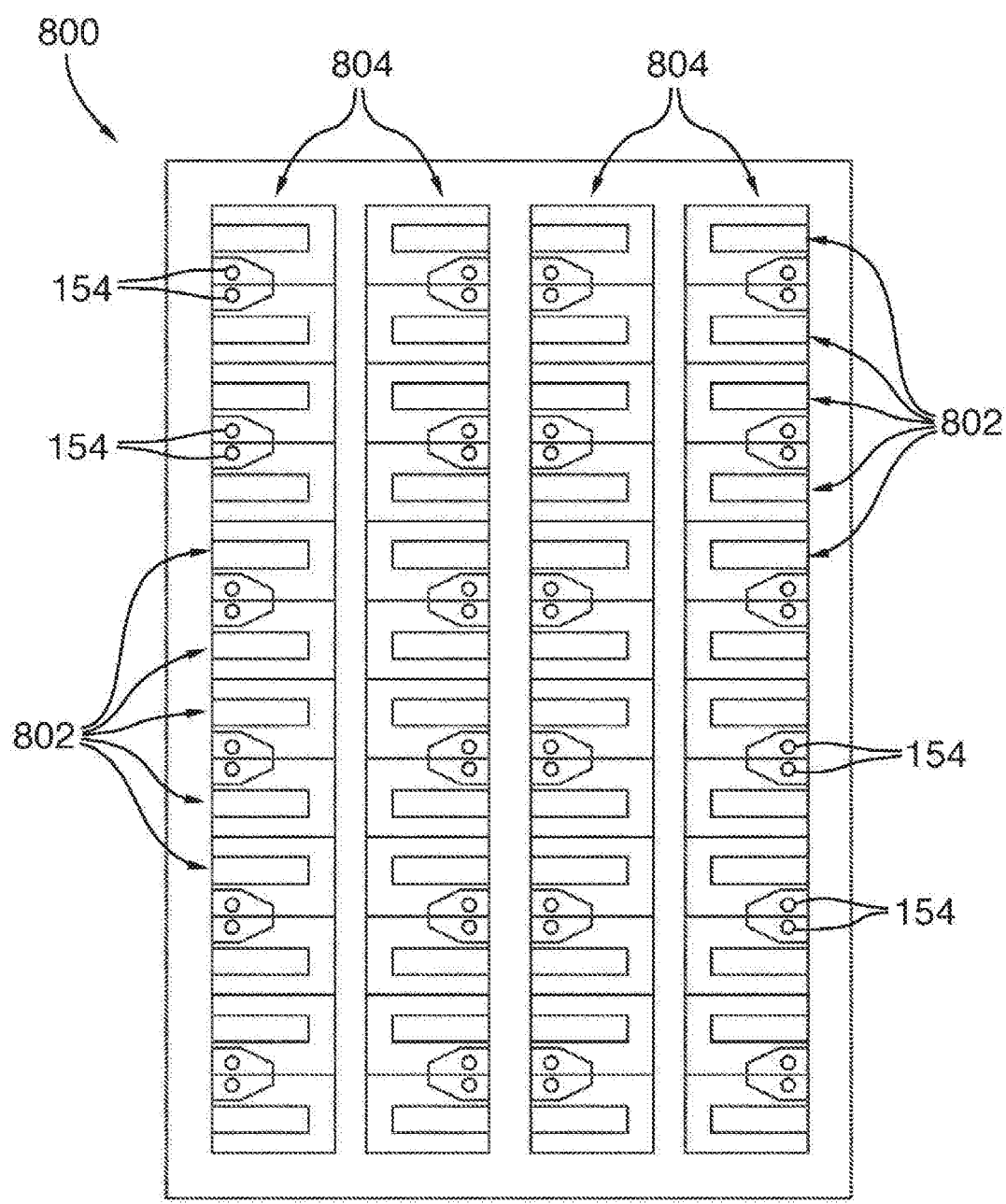
FIG. 8 is a top schematic view of a farrowing facility containing a plurality of farrowing systems similar to the farrowing system illustrated in FIG. 1.

Referring now to FIG. 8, there is shown a farrowing facility 800 including a plurality of farrowing units 802 similar to the farrowing system 100 illustrated in FIGS. 1 to 3. Each farrowing unit 802 includes a farrowing pen 804 and a heating lamp 806 which are similar to the farrowing pen 102 and the first heating lamp 154 illustrated in FIGS. 1 to 3. Each farrowing unit 802 could further include any of the other components of the farrowing system 100 described above in relation to FIGS. 1 to 3.

In the embodiment illustrated in FIG. 8, the farrowing units 802 are disposed adjacent each other in parallel rows 804. Furthermore, the farrowing units 802 are configured such that adjacent farrowing units 802 in the same row 804 are mirror images of each other. According to this configuration, the heating lamp 154 of any one of the farrowing unit 802 is located relatively close to the heating lamp 154 of an adjacent farrowing unit 802. It will be appreciated that this configuration allows the adjacent heating lamps 154 to collaborate together create localized heated areas providing heat to both adjacent farrowing units 802, thereby optimizing power consumption and energy efficiency.

Figure 9:
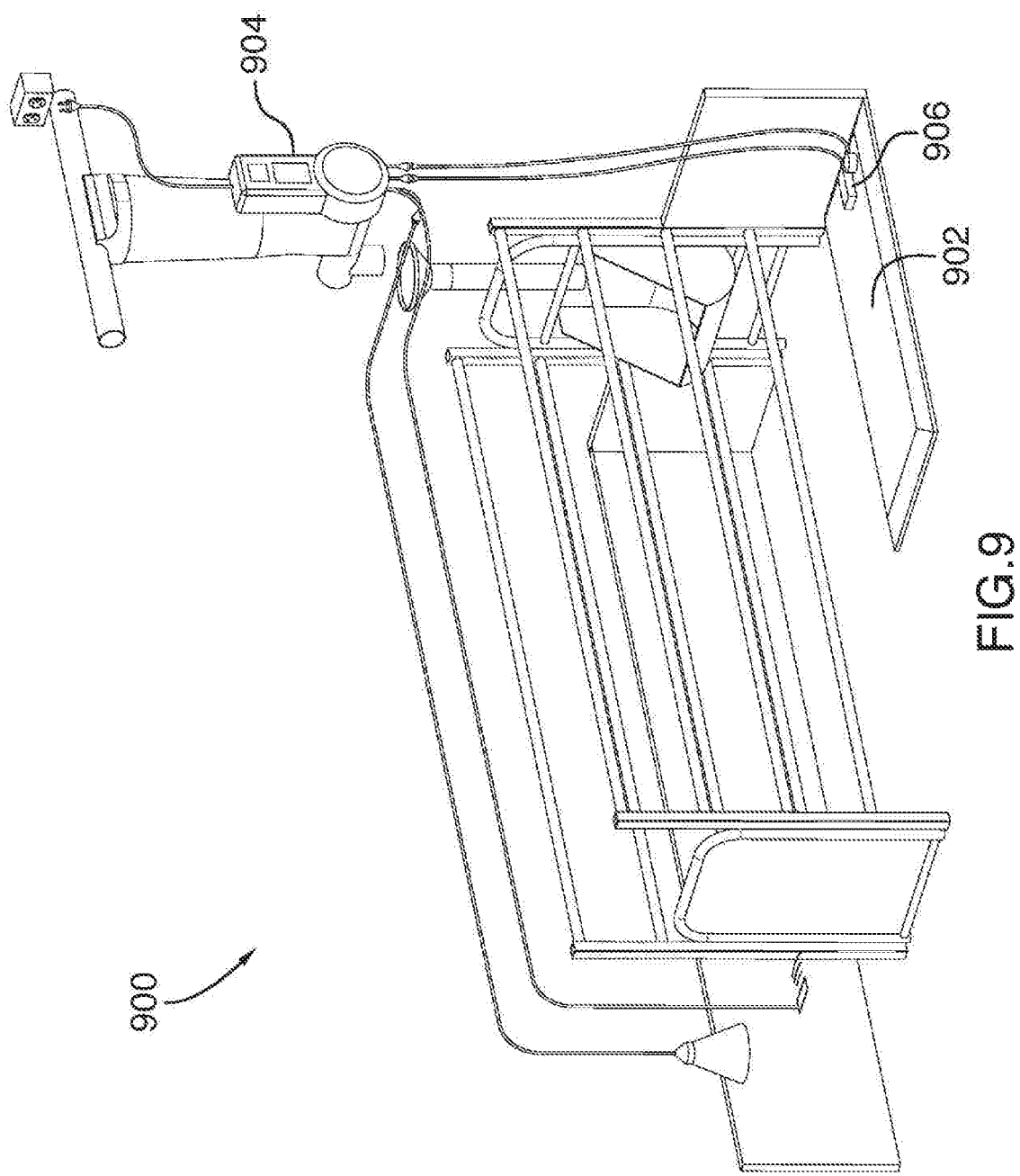
FIG. 9 is a top perspective view of a farrowing system, in accordance with one embodiment, with the rear and right side walls removed to show details of the farrowing pen.

Now turning to FIG. 9, there is shown a farrowing system 900, in accordance with an alternative embodiment. In this embodiment, the farrowing system 900 does not include a roof panel or a first heating lamp. Instead, the farrowing system 900 include a heating mat 902 which is operatively connected to a controller 904. The system 900 further includes a thermal sensor 906 located on the heating mat 902 and operatively connected to the controller 904. The heating mat 902 and the thermal sensor 906 have substantially the same function as the first heating lamp 154 and the thermal sensor 158 illustrated in FIGS. 1 to 3. Instead of having a tendency to move to the alcove 152 under the roof panel 150 as in the embodiment illustrated in FIGS. 1 to 3, the newborn piglet will instead tend to move towards the heating mat 902 and position itself on the heating mat 902 to be heated to an appropriate temperature.

In one embodiment, the heating mat 902 has a power consumption of only 85 W, which further reduces the total power consumption of the farrowing system 900.

In an alternative embodiment, the farrowing system 900 could include both a heating mat 902 and heating lamps, such as the first and second heating lamps 154, 156 illustrated in FIGS. 1 to 3, to enable the system 900 to reach the target temperature more quickly.

Figure 10:
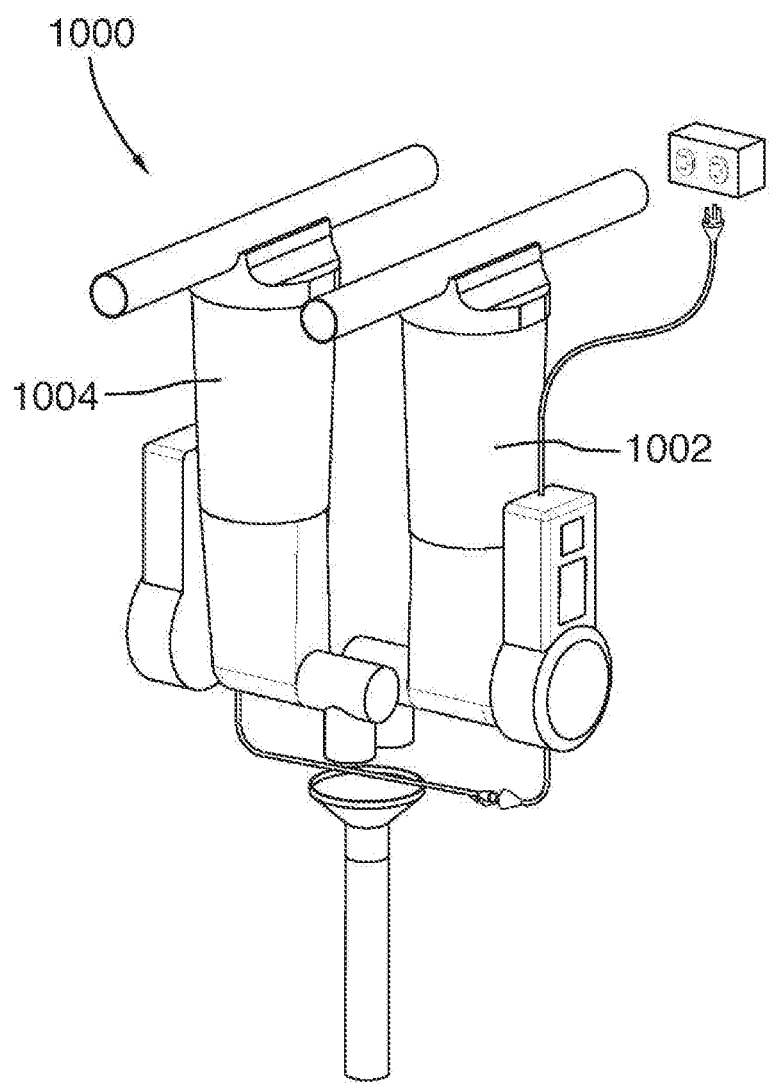
FIG. 10 is a top perspective view of a feed dispenser for a farrowing system, in accordance with an alternative embodiment.

Referring now to FIG. 10, there is shown a feed dispenser 1000 for the farrowing system 100, in accordance with an alternative embodiment.

In the illustrated embodiment, the feed dispenser 1000 includes a first dispensing unit 1002 and a second dispensing unit 1004. The first and second dispensing units 1002, 1004 are generally similar to each other, but may contain different types of feed. Both the first and second dispensing units 1002, 1004 are adapted to dispense feed into a common feed conduit 1006 which directs the feed to a feed receiver, not shown, below.

In one embodiment, when feed is dispensed according to a pre-birth feeding pattern before the detection of the birth of a piglet, feed could be dispensed only through the first dispensing unit 1002. More specifically, feed from the second dispensing unit 1004 may only be dispensed during the nursing period after the detection of the birth of a piglet. In one embodiment, the second heating lamp 156 is operatively connected to an electrical outlet and is disconnected after the birth period to operatively connect the second dispensing unit 1004 to the same electrical outlet manually by the user. This would minimize the amount of outlet required near the farrowing pen 102, which may also minimize the amount of electromagnetic radiation emitted by the system 100.

Alternatively, the second heating lamp 156 and the second dispensing unit 1004 may be operatively connected to different electrical outlets such that the second heating lamp 156 does not need to be disconnected to activate the second dispensing unit 1004. Instead, both the second heating lamp 156 and the second dispensing unit 1004 could be operatively coupled to an on/off switch which could be operated automatically by the controller 106 based on the detection of the birth of a piglet or manually by the user.

Figure 11:
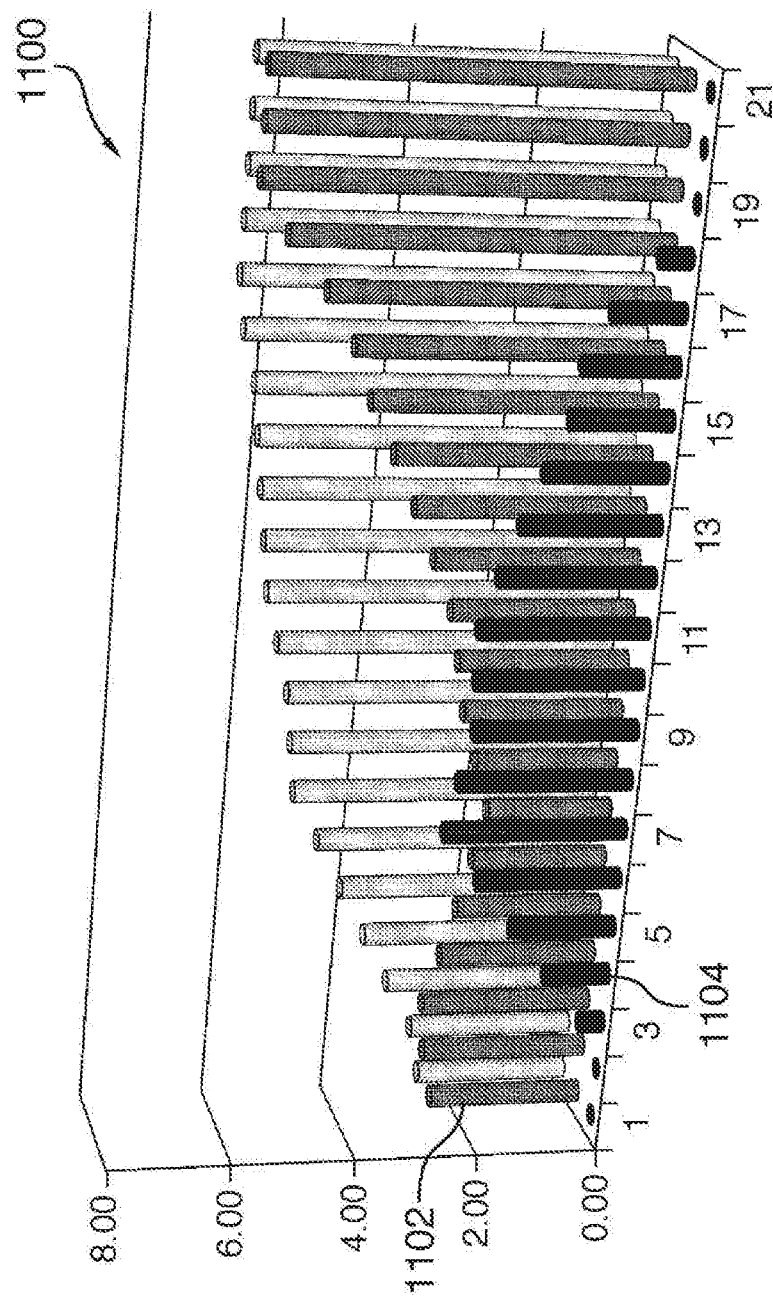
FIG. 11 is a chart showing a post-birth feeding pattern including a first feed type and a second feed type dispensed using the farrowing system illustrated in FIG. 10, in accordance with one embodiment.

Turning now to FIG. 11, there is shown an example of a post-birth feeding pattern 1100 including the first feed type 1102 and the second feed type 1104. Specifically, the pattern 1100 shows an amount of feed dispensed as a function of time, in days since the direction of the birth of the piglet. It will be understood that in this example, the second feed type is not dispensed during the first two days, which correspond to the birth period, since the second heating lamp 156 is activated during the birth period and thereby uses the electrical outlet required by the second dispensing unit 1004, as explained above.

Once the birth period is over and the second heating lamp 156 is deactivated, the second dispensing unit 1004 may be activated and may dispense the second feed type 1104 according to the pattern 1100. In one embodiment, the first and second dispensing unit 1102, 1104 are not activated simultaneously, but only concurrently, to limit the total power consumption as explained above.

Figure 12:
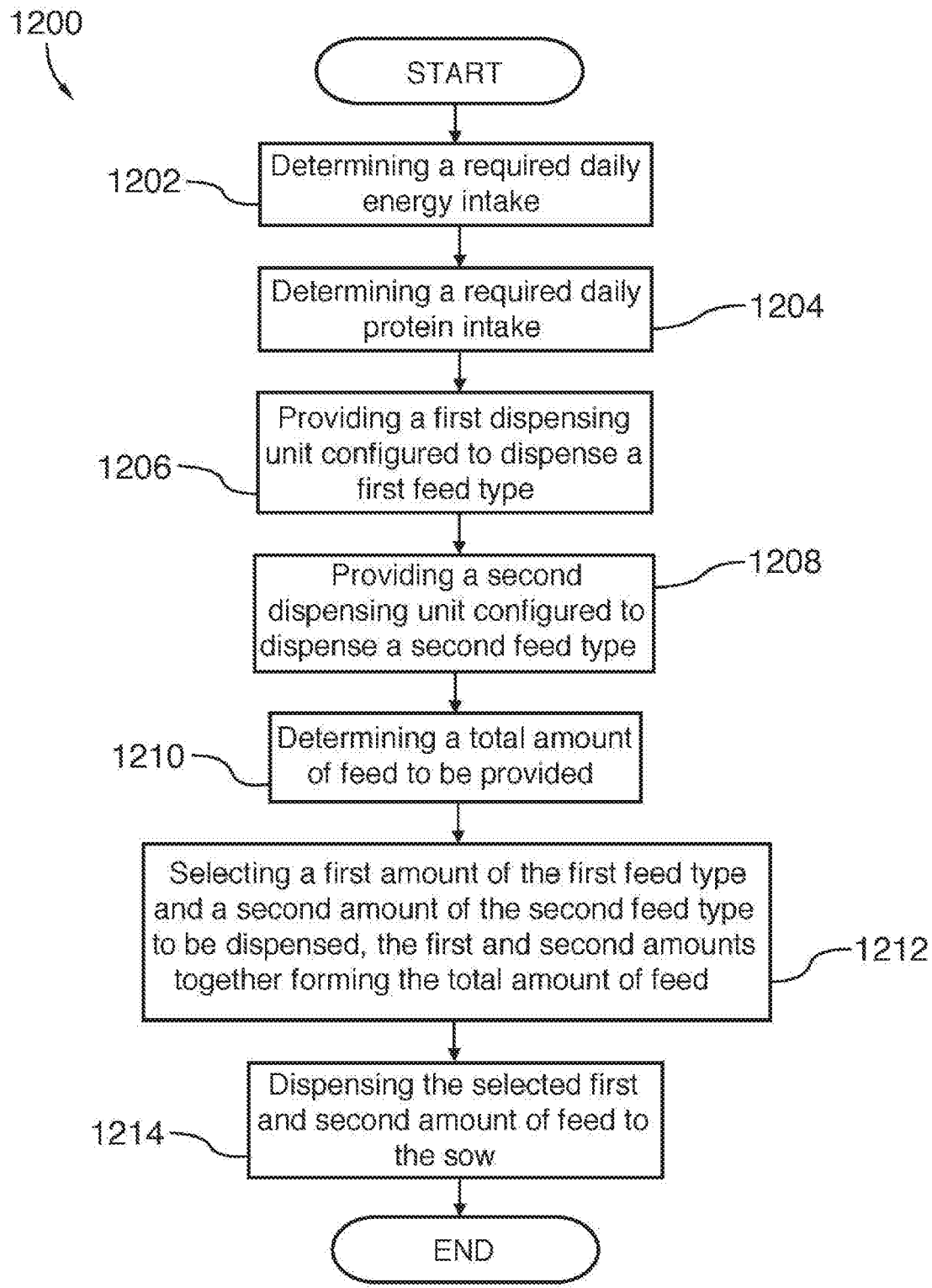
FIG. 12 is a flowchart showing a method for dispensing feed to a farrowing sow, in accordance with one embodiment.

Referring now to FIG. 12, there is shown a method for providing feed to a sow, in accordance with one embodiment.

According to this method, the feed may be dispensed according to various parameters which may include time, expressed in days since the detection of the birth of a piglet, as well as additional parameters such as a desired or required daily energy intake of the sow. Specifically, the energy intake may refer to a metabolizable energy (ME) intake, which corresponds to an amount of energy available to the sow when the feed is ingested by the sow.

It will be appreciated that a nursing sow is typically fed with feed which contains a certain amount of protein, such as lysine. A first portion of the energy metabolized will maintain the sow's weight during nursing, while a second portion of the energy will be used to create milk for the piglets. There may therefore be a need that the sow be provided with a certain amount of energy every day. Furthermore, this required daily energy intake may vary over time, expressed in the number of days since the birth of the piglets. Specifically, the required daily energy intake may vary as a function of a weight growth or a projected weight gain of the piglets or the piglet litter.

In one embodiment, the amount of energy in the first portion required to maintain the sow's weight during nursing $E_m$ may be calculated using the following equation:

$$E_m = 105 \text{ kcal/kg} * WS^{0.75} \quad \text{(Eq. 1)}$$

in which WS is the sow's weight in kg.

In one embodiment, the amount of energy in the second portion required to provide a target weight gain to the litter $E_g$ may be calculated using the following equation:

$$E_g = 7000 \text{ kcal/kg} * WG \quad \text{(Eq. 2)}$$

in which WG is the target weight gain in kg/day.

The total required daily energy intake would therefore include a sum of the amount of energy required to maintain the sow's weight $E_m$ and the amount of energy required to attain a target weight gain of the litter $E_g$.

The additional parameters may further include a desired or required daily protein intake of the sow. It will be appreciated that a nursing sow is typically fed with feed which contains a certain amount of protein, such as lysine. A first portion of the proteins in the feed are required to maintain the sow healthy during nursing, but a second, main portion of the proteins are metabolized to create milk which is ingested by the suckling piglets and helps their growth. There may therefore be a need that the sow be provided with a certain amount of proteins every day. Furthermore, this required daily protein intake may vary over time, expressed in the number of days since the birth of the piglets. Specifically, the required daily protein intake may vary as a function of a weight growth or a projected weight gain of the piglets or the piglet litter.

In one embodiment, the amount of protein required to maintain the sow's weight during nursing $P_m$ can be calculated using the following equation:

$$P_m = 36 \text{ mg} * WS^{0.75} \quad \text{(Eq. 3)}$$

in which WS is the sow's weight in kg.

Alternatively, the amount of protein in the first portion required to maintain the sow's weight during nursing $P_m$ can be estimated to about 2 g/day.

In one embodiment, the amount of protein in the second portion required to provide a target weight gain to the litter $P_g$ may be calculated using the following equation:

$$P_g = 26 \text{ g/kg} * WG \quad \text{(Eq. 4)}$$

in which WG is the target weight gain in kg/day.

The total required daily protein intake would therefore include a sum of the amount of protein required to maintain the sow's weight $P_m$ and the amount of protein required to provide a target weight gain to the litter $P_g$.

According to steps 1202 and 1204 of the method 1200, the required daily energy intake and the required daily protein intake of the sow are first determined using the above equations, based on the sow's weight WS and the target weight gain WG.

It will be understood that the target weight gain WG corresponds to the target weight gain of the entire litter being nursed by the sow. It will be appreciated that the target weight gain WG may increase over time as the growth of the piglets accelerate, and therefore that the target weight gain WG corresponds to a weight gain value for a specific day after the birth of the piglets.

For example, the target weight gain WG on the fifth day after the birth of the piglets may be higher than the target weight gain WG on the second day after the birth of the piglets.

In one embodiment, the weight gain WG is calculated by measuring the piglet litter weight every day. In this embodiment, the target weight gain WG may correspond to a difference between the measured litter weight and the measured litter weight of the previous day.

In one embodiment, the required daily energy intake and the required daily protein intake of the sow are determined using a controller, which may include a processing unit and a memory operatively connected to the processing unit. In this embodiment, the measured litter weights, each one associated to a day on which it was measured expressed as the number of days since the birth of the piglets, may be stored in the memory.

It will be appreciated that the required daily energy intake and the required daily protein intake of the sow may be determined simultaneously such that steps 1202 and 1204 are performed simultaneously, or one after the other such that step 1202 may be performed before step 1204 or step 1204 may be performed before step 1202.

According to steps 1206 and 1208, a first dispensing unit and a second dispensing unit are provided. The first dispensing unit is configured to dispense a first feed type having a first protein content and a first energy content, and the second dispensing unit is configured to dispense a second feed type having a second protein content and a second energy content.

In one embodiment, the method 1200 is adapted to be performed using the farrowing system 1000 described above. Specifically, the first and second dispensing units may be similar to the first and second dispensing units 1002, 1004 described above. Alternatively, the first and second dispensing units may be configured according to any configuration which a skilled person may consider to be suitable.

According to step 1210, a total amount of feed to be provided to the sow is then determined. It will be appreciated that the total amount of feed to be provided may vary over time, expressed as the number of days since the birth of the piglets, as the piglets grow.

In one embodiment, the total amount of feed to be provided may be determined according to an appetite of the sow, i.e. an actual amount of feed that the sow would ingest on a specific day following the birth of the piglets. The appetite of the sow may be observed on other, similar sows having a similar weight, for example.

Alternatively, the total amount of feed to be provided for each day following the birth of the piglets may be predetermined. For example, the total amount of feed to be provided may be taken from standard industry charts or similar sources.

In the illustrated embodiment, the total amount of feed to be provided each day includes a first amount of the first feed type and a second amount of the second feed type. Specifically, a first portion of the total amount of feed includes the first feed type, and the rest of the total amount of feed includes the second feed type.

According to step 1212, the first amount of the first feed type and the second amount of the second feed type are selected such that the sum of the energy content of the first amount of the first feed type and the second amount of the second feed type is substantially equal to the required daily energy intake of the sow.

The first amount of the first feed type and the second amount of the second feed type are also selected such that the sum of the protein content of the first amount of the first feed type and the second amount of the second feed type is substantially equal to the required daily protein intake of the sow.

Therefore, by using this method 1200, the proportion of the first feed type versus the second feed type in the total amount of feed to be provided is optimized such that the total protein and energy content of the total amount of feed dispensed is similar or relatively close to the required daily protein and energy intake of the sow calculated using the above Equations 1 to 4.

If only a single feed type was used, for a given total amount of feed to be provided, it would not be possible to vary the protein content and/or the energy content as needed, which may result in the sow, and by the extension the piglets ingesting the sow's milk, being undernourished.

According to step 1214, after the first and second amount of the first and second feed type have been selected in step 1212, the first and second amount of the first and second feed type are then dispensed to the sow. The first and second amounts could be dispensed simultaneously, or one after the other and/or according to a predetermined feeding schedule. For example, both the first amount of the first feed type and the second amount of the second feed type may be dispensed simultaneously, once a day, such that they are mixed together when ingested by the sow. In one embodiment, the total amount of feed to be dispensed is split in two portions which are dispensed to the sow separately at different time during the day, such that the sow is fed twice a day. Alternatively, many other feeding schedule may be possible.

The above method 1200 will be further understood from the Example below.

EXAMPLE

In the following example, the sow's weight WS is 190 kg and the sow is at a first parity. Still in the following example, data is shown for the first 21 days following the birth of the piglets, which corresponds to a nursing period of 21 days. Alternatively, the nursing period could be shorter or longer than 21 days.

TABLE 1 below shows an example of projected weight gains WG of an entire piglet litter over time, expressed in the number of days since the birth of the piglets, as well as the average weight of each piglet for a litter of 12 piglets:

TABLE 1

Projected daily weight gain of the litter and average piglet weight, depending on the number of days since the birth

| Day | Litter Weight (kg) | Daily Weight Gain (kg) | Average Piglet Weight (kg) |
| --- | --- | --- | --- |
| 0 | 22.584 | 1.180 | 1.882 |
| 1 | 23.764 | 1.747 | 1.980 |
| 2 | 25.511 | 1.602 | 2.126 |
| 3 | 27.113 | 1.703 | 2.259 |
| 4 | 28.816 | 1.810 | 2.401 |
| 5 | 30.626 | 1.924 | 2.552 |
| 6 | 32.550 | 2.045 | 2.712 |
| 7 | 34.594 | 2.173 | 2.883 |
| 8 | 36.767 | 2.309 | 3.064 |
| 9 | 39.077 | 2.455 | 3.256 |
| 10 | 41.531 | 2.609 | 3.461 |
| 11 | 44.140 | 2.773 | 3.678 |
| 12 | 46.913 | 2.947 | 3.909 |

TABLE 1-continued

Projected daily weight gain of the litter and average piglet weight, depending on the number of days since the birth

| Day | Litter Weight (kg) | Daily Weight Gain (kg) | Average Piglet Weight (kg) |
|---|---|---|---|
| 13 | 49.859 | 3.132 | 4.155 |
| 14 | 52.991 | 3.329 | 4.416 |
| 15 | 56.320 | 3.538 | 4.693 |
| 16 | 59.857 | 3.760 | 4.988 |
| 17 | 63.617 | 3.996 | 5.301 |
| 18 | 67.613 | 4.247 | 5.634 |
| 19 | 71.860 | 4.514 | 5.988 |
| 20 | 76.374 | 4.797 | 6.634 |
| 21 | 81.171 | 4.829 | 6.764 |

Using the above values for the weight gains WG and sow's weight WS, the total required daily energy intake and the total required daily protein intake can be calculated for each day following the birth of the piglets using Equations 1 to 4 above. The results of these calculations are shown in TABLE 2 below:

TABLE 2

Calculated required daily protein and energy intakes of the sow, depending on the number of days since the birth

| Day | Required Protein Intake (g) | Required Energy Intake (kcal) |
|---|---|---|
| 0 | 32.67 | 13 632 |
| 1 | 47.41 | 17 599 |
| 2 | 43.66 | 16 590 |
| 3 | 46.28 | 17 295 |
| 4 | 49.06 | 18 044 |
| 5 | 52.02 | 18 839 |
| 6 | 55.16 | 19 685 |
| 7 | 58.50 | 20 584 |
| 8 | 62.05 | 21 540 |
| 9 | 65.82 | 22 555 |
| 10 | 69.83 | 23 634 |
| 11 | 74.09 | 24 781 |
| 12 | 78.61 | 26 000 |
| 13 | 83.43 | 27 296 |
| 14 | 88.54 | 28 673 |
| 15 | 93.98 | 30 137 |
| 16 | 99.76 | 31 692 |
| 17 | 105.90 | 33 345 |
| 18 | 112.42 | 35 102 |
| 19 | 119.36 | 36 970 |
| 20 | 126.73 | 38 954 |
| 21 | 126.00 | 38 956 |

The first dispensing unit and the second dispensing unit are then provided to dispense respectively the first and second feed types. TABLE 3 below shows the protein content and the energy content of the first and second feed types of feed used in this example:

TABLE 3

Protein and energy content of the first and second feed types

|  | First Feed Type | Second Feed Type |
|---|---|---|
| Protein Content | 0.80% | 1.45% |
| Energy Content (kcal/kg) | 3500 | 5000 |

As explained above, a total amount of feed to be provided is determined. TABLE 4 below shows total amounts of feed to be provided for each day following the birth of the piglets, and for whether it is a first parity, a second parity or a third parity for the sow:

TABLE 4

Total amount of feed to be provided to the sow, depending on the number of days since birth

| Day | First Parity (kg/day) | Second Parity (kg/day) | Third Parity and Beyond (kg/day) |
|---|---|---|---|
| 0 | 2.500 | 2.500 | 2.500 |
| 1 | 2.700 | 2.948 | 3.700 |
| 2 | 3.175 | 3.629 | 4.082 |
| 3 | 3.629 | 4.082 | 4.763 |
| 4 | 4.082 | 4.536 | 5.216 |
| 5 | 4.536 | 4.876 | 5.700 |
| 6 | 4.990 | 5.216 | 6.100 |
| 7 | 5.103 | 5.670 | 6.260 |
| 8 | 5.216 | 5.897 | 6.396 |
| 9 | 5.443 | 6.124 | 6.500 |
| 10 | 5.670 | 6.350 | 6.650 |
| 11 | 5.783 | 6.577 | 6.804 |
| 12 | 5.897 | 6.804 | 6.917 |
| 13 | 6.010 | 6.804 | 7.031 |
| 14 | 6.124 | 7.258 | 7.258 |
| 15 | 6.350 | 7.258 | 7.400 |
| 16 | 6.464 | 7.258 | 7.500 |
| 17 | 6.464 | 7.371 | 7.600 |
| 18 | 6.464 | 7.371 | 7.700 |
| 19 | 6.464 | 7.371 | 7.800 |
| 20 | 6.464 | 7.371 | 7.850 |
| 21 | 6.464 | 7.371 | 7.900 |

TABLE 5 below shows the first and second amounts of the first and second feeds which are selected for each day following the birth of the piglets, to try and dispense a total protein content and a total energy content which are as close as possible to the calculated required daily protein and energy intake:

TABLE 5

Total amount of feed to be provided to the sow, depending on the number of days since the birth

| Day | First Feed Type % of total feed | First Feed Type kg | Second Feed Type % of total feed | Second Feed Type kg | Total Protein Content g | Total Energy Content kcal |
|---|---|---|---|---|---|---|
| 0 | 22.01 | 0.55 | 77.99 | 1.95 | 32.67 | 11 675 |
| 1 | 0.00 | 0.00 | 100.00 | 2.70 | 39.15 | 13 500 |
| 2 | 11.51 | 0.37 | 88.49 | 2.81 | 43.66 | 15 327 |
| 3 | 26.88 | 0.98 | 73.12 | 2.65 | 46.28 | 16 682 |
| 4 | 38.17 | 1.56 | 61.83 | 2.52 | 49.06 | 18 073 |
| 5 | 46.65 | 2.12 | 53.35 | 2.42 | 52.02 | 19 506 |
| 6 | 53.02 | 2.65 | 46.98 | 2.34 | 55.16 | 20 982 |
| 7 | 46.72 | 2.38 | 53.28 | 2.72 | 58.50 | 21 939 |
| 8 | 40.07 | 2.09 | 59.93 | 3.13 | 62.05 | 22 045 |
| 9 | 37.04 | 2.02 | 62.96 | 3.43 | 65.82 | 24 191 |
| 10 | 33.61 | 1.91 | 66.39 | 3.76 | 69.83 | 25 491 |
| 11 | 25.98 | 1.50 | 74.02 | 4.28 | 74.09 | 26 661 |
| 12 | 17.98 | 1.06 | 82.02 | 4.84 | 78.61 | 27 895 |
| 13 | 9.52 | 0.57 | 90.48 | 5.44 | 83.43 | 29 192 |
| 14 | 0.64 | 0.04 | 99.36 | 6.08 | 88.54 | 30 561 |
| 15 | 0.00 | 0.00 | 100.00 | 6.35 | 92.08 | 31 750 |
| 16 | 0.00 | 0.00 | 100.00 | 6.46 | 93.73 | 32 320 |
| 17 | 0.00 | 0.00 | 100.00 | 6.46 | 93.73 | 32 320 |
| 18 | 0.00 | 0.00 | 100.00 | 6.46 | 93.73 | 32 320 |
| 19 | 0.00 | 0.00 | 100.00 | 6.46 | 93.73 | 32 320 |
| 20 | 0.00 | 0.00 | 100.00 | 6.46 | 93.73 | 32 320 |
| 21 | 0.00 | 0.00 | 100.00 | 6.46 | 93.73 | 32 320 |

Finally, TABLE 6 below shows in a side-by-side comparison the total protein and energy contents dispensed to the sow (from TABLE 4) and the required daily protein and energy intakes for the sow (from TABLE 2):

TABLE 6

Comparison between the required daily protein and energy intake and the total protein and energy content dispensed

| Day | Required Protein Intake (g) | Total Protein Content Dispensed (g) | Required Energy Intake (kcal) | Total Energy Content Dispensed (kcal) |
|---|---|---|---|---|
| 0  | 32.67  | 32.67  | 13 632 | 11 675 |
| 1  | 47.41  | 39.15  | 17 599 | 13 500 |
| 2  | 43.66  | 43.66  | 16 590 | 15 327 |
| 3  | 46.28  | 46.28  | 17 295 | 16 682 |
| 4  | 49.06  | 49.06  | 18 044 | 18 073 |
| 5  | 52.02  | 52.02  | 18 839 | 19 506 |
| 6  | 55.16  | 55.16  | 19 685 | 20 982 |
| 7  | 58.50  | 58.50  | 20 584 | 21 939 |
| 8  | 62.05  | 62.05  | 21 540 | 22 945 |
| 9  | 65.82  | 65.82  | 22 555 | 24 191 |
| 10 | 29.83  | 69.83  | 23 634 | 25 491 |
| 11 | 74.09  | 74.09  | 24 781 | 26 661 |
| 12 | 78.61  | 78.61  | 26 000 | 27 895 |
| 13 | 83.43  | 83.43  | 27 296 | 29 192 |
| 14 | 88.54  | 88.54  | 28 673 | 30 561 |
| 15 | 93.98  | 92.08  | 30 137 | 31 750 |
| 16 | 99.76  | 93.73  | 31 692 | 32 320 |
| 17 | 105.90 | 93.73  | 33 345 | 32 320 |
| 18 | 112.42 | 93.73  | 35 102 | 32 320 |
| 19 | 119.36 | 93.73  | 36 970 | 32 320 |
| 20 | 126.73 | 93.73  | 38 954 | 32 320 |
| 21 | 126.00 | 93.73  | 38 956 | 32 320 |

It can be observed from TABLE 6 that using the method 1200, the total protein content dispensed each day is substantially similar or close to the calculated required daily protein intake, and the total energy content dispensed each day is also substantially similar or close to the calculated required daily energy intake.

As shown in TABLES 5 and 6 above, after the 15$^{th}$ day following the birth of the piglets, the total feed amount dispensed to the sow includes only the second feed type. Therefore, the total amount of feed provided cannot contain more protein and energy than the second feed type's protein and energy content, and the protein and energy contents of the total amount of feed is capped at a certain maximum level, even if the required daily protein and energy intakes increase above this maximum level.

However, despite this difference, it has been estimated that in this example, the sow would only lose 0.166 kg during the nursing period.

It will be appreciated that the selection of the first and second amount of the first and second feed types in specific quantities and in specific proportions to each other, in accordance with the method 1200, allows the protein content to be adjusted as required.

By contrast, if only a single feed type was used or if the first and second feed types were used in fixed predetermined quantities, it would not be possible to vary protein or energy content of the feed provided to the sow from day to day as required.

In an alternative embodiment, instead of a first dispensing unit and a second dispensing unit being provided, the method 1200 could include dispensing only a single dispensing unit adapted to dispense successively both the first and the second feed types.

In yet another embodiment, the method 1200 could include providing additional dispensing units and more than two feed types may be dispensed. For example, the method may include dispensing a first feed type, a second feed type and a third feed type which all have different protein and energy content. This embodiment would allow even more combinations to be created in order to be able to dispense a total amount of feed containing even more precisely the required daily protein and energy contents.

The embodiments described above are intended to be exemplary only. The scope of the invention is therefore intended to be limited solely by the appended claims.

The invention claimed is:

1. A farrowing system comprising:
    a farrowing pen adapted to receive a sow;
    a feed dispenser for dispensing feed to the sow received in the farrowing pen according to a first feeding pattern;
    a birth detection sensor for detecting a birth of a piglet from the sow;
    at least one heating element for providing heat to a portion of the farrowing pen;
    a controller operatively connected to the birth sensor and to the feed dispenser for switching from the first feeding pattern to a second feeding pattern upon detection of the birth of the piglet, the controller being further connected to the at least one heating element for activating the at least one heating element upon the detection of the birth of the piglet,
    wherein the controller is further configured for deactivating the at least one heating element during a providing of the feed and reactivating the at least one heating element after the providing of the feed to control a power consumption of the farrowing system.

2. The system as claimed in claim 1, wherein the farrowing pen includes a sow receiving space for receiving the sow and a main piglet receiving area adjacent the sow receiving space for receiving the piglet.

3. The system as claimed in claim 2, wherein the farrowing pen further includes a floor and a roof panel extending over a portion of the main piglet receiving area, the roof panel being generally planar and spaced upwardly from the floor to define an alcove therebetween, the alcove being sized and shaped to receive the piglet.

4. The system as claimed in claim 2, wherein the at least one heating element is disposed towards the main piglet receiving area for providing heat to the main piglet receiving area.

5. The system as claimed in claim 4, wherein the at least one heating element includes a first heating lamp located in the main piglet receiving area and a second heating lamp.

6. The system as claimed in claim 4, wherein the at least one heating element includes a heating mat disposed in the main piglet receiving area.

7. The system as claimed in claim 4, further including a thermal sensor operatively connected to the controller and disposed in the main piglet receiving area for measuring the temperature in the main piglet receiving area.

8. The system as claimed in claim 7, wherein the controller is configured to maintain the temperature in the main piglet receiving area at a target temperature by measuring the temperature in the main piglet receiving area and by adjusting the intensity of the at least one heating element according to the measured temperature until the measured temperature reaches the target temperature.

9. The system as claimed in claim 7, wherein the controller is configured to maintain the temperature in the main piglet receiving area at a target temperature by measuring the temperature in the main piglet receiving area and by selectively activating the at least one heating element at a predetermined intensity when the measured temperature is below the target temperature and deactivating the at least one heating element when the measured temperature is at or above the target temperature.

10. The system as claimed in claim 9, further comprising a feed container disposed between the first and second vertical barriers to receive feed from the feed dispenser.

11. The system as claimed in claim 2, wherein the farrowing pen includes a first vertical barrier and a second vertical barrier parallel to and spaced from the first vertical barrier to define the sow receiving space therebetween.

12. The system as claimed in claim 11, wherein the first and second vertical barriers are selectively movable laterally towards and away from each other to allow the width of the sow receiving space to be adjusted depending on the size of the sow received in the sow receiving space.

13. The system as claimed in claim 1, wherein the feed dispenser includes a first feed dispensing unit adapted to dispense a first feed type and a second dispensing unit adapted to dispense a second feed type.

14. The system as claimed in claim 1, wherein the birth detection sensor is selected from a group consisting of: a movement sensor and a thermal sensor.

15. A method for operating a farrowing system, the method comprising:
providing feed to a sow in a farrowing pen according to a first feeding pattern;
monitoring the farrowing pen;
upon detection of a birth of a piglet from the sow, switching from the first feeding pattern to a second feeding pattern and activating at least one heating element,
wherein said activating the at least one heating element comprises:
deactivating the at least one heating element during the providing of the feed; and
reactivating the at least one heating element after the providing of the feed, thereby controlling a power consumption of the farrowing system.

16. The method as claimed in claim 15, wherein activating at least one heating element includes activating a first heating lamp and activating a second heating lamp.

17. The method as claimed in claim 16, wherein activating the first heating lamp includes activating the first heating lamp for a first period of time and further wherein activating the second heating lamp includes activating the second heating lamp for a second period of time shorter than the first period of time.

18. The method as claimed in claim 16, wherein activating the first heating lamp includes:
measuring a temperature in a portion of the farrowing pen;
comparing the measured temperature with a target temperature;
adjusting an intensity of the first heating lamp according to a difference between the measured temperature and the target temperature.

19. The method as claimed in claim 18, wherein the target temperature varies as a function of time according to a predetermined temperature pattern.

20. The method as claimed in claim 15, wherein activating at least one heating element includes activating a heating mat and activating a heating lamp.

21. The method as claimed in claim 15, wherein providing feed includes providing a first feed type from a first feed dispensing unit and a second feed type from a second feed dispensing unit.

22. The method as claimed in claim 15, wherein the second feeding pattern is selected from a plurality of feeding patterns based on the sow's weight.

* * * * *